UNITED STATES PATENT OFFICE.

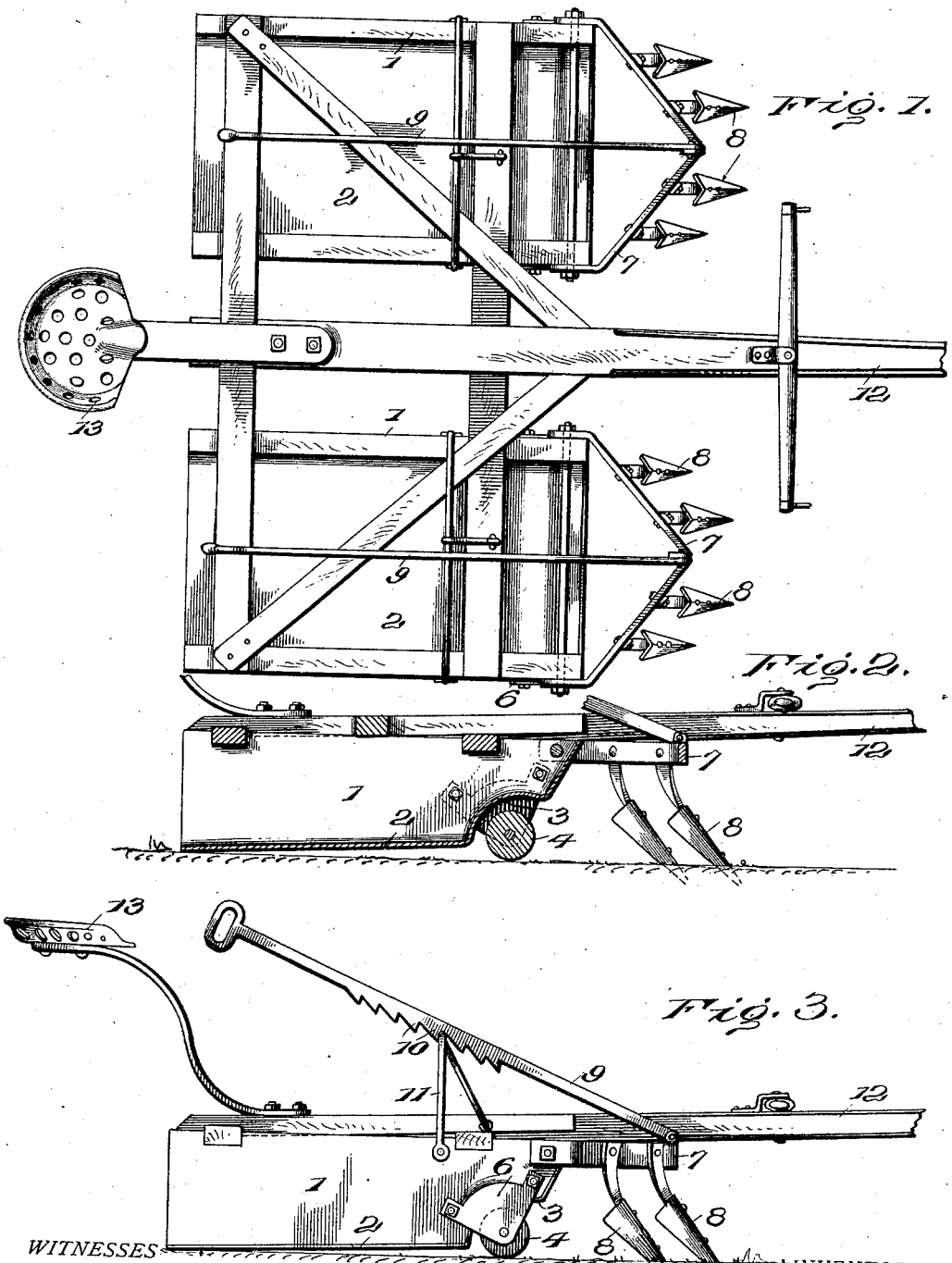

EUROTOS W. GREEN, OF RIDGEFIELD, WASHINGTON.

CULTIVATOR.

1,079,854.  Specification of Letters Patent.  Patented Nov. 25, 1913.

Application filed January 11, 1913. Serial No. 741,413.

*To all whom it may concern:*

Be it known that I, EUROTOS W. GREEN, a citizen of the United States, residing at Ridgefield, in county of Clarke and State of Washington, have invented certain new and useful Improvements in Cultivators, of which the following is a specification.

My invention relates to an improvement in cultivators and the object is to provide cultivator frames, rollers, and stone-boats whereby two or more rows of plants may be cultivated at the same time.

The invention consists of certain novel features of construction and combinations of parts, which will be hereinafter more fully described and pointed out in the claims.

In the accompanying drawings—Figure 1 is a top plan view; Fig. 2 is a longitudinal vertical sectional view through one of the stone-boat frames, rollers and cultivator frames; Fig. 3 is a view in side elevation.

A represents a frame to which runners 1, 1, are connected, and upon which runners the frame is supported. I have shown two sets of runners which are spaced apart sufficiently to permit of the apparatus being drawn through a field and permitting of several rows of plants being treated at the same time. Each set of runners is covered along its lower surface with a bottom 2 forming in effect stone-boats. The forward end of each set of runners and the bottoms thereof are provided with transverse grooves or recesses 3 in which rollers 4 are mounted, the rollers being supported by brackets 6 which are connected to the runners. The rollers extend below the forward ends of the runners preferably one-third of the diameter of the rollers so that the roll portion of the runners and the bottoms thereof act as a stone-boat.

Connected to the forward end of each set of runners is a cultivator frame 7 which is provided with shovels 8. The cultivator frames are pivotally supported on the runners and are capable of being oscillated by means of levers 9. The levers are provided with teeth 10 which are adapted to engage bars 11 which bars are mounted on the runners 1 for holding the shovels at various elevations.

A tongue 12 is connected to the frame A for the purpose of drawing the apparatus across the field by means of draft animals, and a seat 13 is mounted upon the frame.

From the foregoing it will be seen that I have provided a very simple and compact apparatus for cultivating the soil, rolling and dragging it at one operation for the purpose of putting the ground in perfect order for dry farming.

It is evident that slight changes and alterations might be made in the form and arrangement of the several parts described without departing from the spirit and scope of my invention, and hence I do not wish to be limited to the exact construction as herein set forth, but—

Having thus described my invention, what I claim as new and desire to secure by Letters Patent, is—

1. The combination with a frame having runners connected thereto, attachments connected to the lower edges of the runners for forming stone-boats, of rollers journaled at the forward ends of the runners and extending beneath the lower edges of the runners whereby the forward ends of the runners are elevated, cultivator frames carrying shovels pivotally connected to the forward ends of the runners.

2. The combination with a frame having two sets of runners connected thereto, a bottom connected to each set of runners forming stone-boats, rollers journaled at the forward end of each set of runners and extending below the runners for elevating the forward ends of the runners, and cultivator frames carrying shovels pivotally connected to the forward end of each set of runners.

3. The combination with a frame having two sets of runners, a bottom connected to each set of runners for forming stone-boats, each set of runners provided with recesses at the forward ends thereof, rollers received in the recesses, brackets connected to the runners for supporting the rollers below the lower edges of the runners for elevating the forward ends of the runners, cultivator frames carrying shovels pivotally mounted at the forward end of each set of runners, and means for elevating said cultivator frames.

In testimony whereof I affix my signature, in the presence of two witnesses.

EUROTOS W. GREEN.

Witnesses:
J. W. BLACKBURN,
W. A. BARKLEY.

Copies of this patent may be obtained for five cents each, by addressing the "Commissioner of Patents, Washington, D. C."